(12) United States Patent
Honda

(10) Patent No.: US 12,103,653 B2
(45) Date of Patent: Oct. 1, 2024

(54) OUTBOARD MOTOR

(71) Applicant: HONDA MOTOR CO., LTD., Tokyo (JP)

(72) Inventor: Kenji Honda, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 418 days.

(21) Appl. No.: 17/585,058

(22) Filed: Jan. 26, 2022

(65) Prior Publication Data

US 2022/0242540 A1 Aug. 4, 2022

(30) Foreign Application Priority Data

Feb. 1, 2021 (JP) ................................ 2021-014265

(51) Int. Cl.
| | | |
|---|---|---|
| B63H 21/20 | (2006.01) | |
| B63H 20/10 | (2006.01) | |
| B63H 20/12 | (2006.01) | |
| B63H 20/22 | (2006.01) | |
| B63H 20/24 | (2006.01) | |

(Continued)

(52) U.S. Cl.
CPC ............. *B63H 21/20* (2013.01); *B63H 20/10* (2013.01); *B63H 20/12* (2013.01); *B63H 20/22* (2013.01); *B63H 20/24* (2013.01); *B63H 20/30* (2013.01); *B63H 23/14* (2013.01); *B63H 23/30* (2013.01); *F02M 35/167* (2013.01); *B60L 2200/32* (2013.01); *B63H 2021/205* (2013.01)

(58) Field of Classification Search
CPC ........ B63H 21/20; B63H 20/10; B63H 20/12; B63H 20/22; B63H 20/24; B63H 20/30; B63H 23/14; B63H 23/30; B63H 2021/205; F02M 35/167; B60L 2200/32

See application file for complete search history.

(56) References Cited

U.S. PATENT DOCUMENTS

2006/0073934 A1  4/2006  Kasahara

FOREIGN PATENT DOCUMENTS

| EP | 2450273 A2 * | 5/2012 | ............. B63H 20/32 |
| GB | 833343 A | 4/1960 | |
| JP | 5293335 B2 | 9/2013 | |

OTHER PUBLICATIONS

Search Report for German Patent Application No. 102022101824.5 dated Sep. 27, 2023; 16 pp.

(Continued)

*Primary Examiner* — Stephen P Avila
(74) *Attorney, Agent, or Firm* — Armstrong Teasdale LLP

(57) ABSTRACT

An outboard motor includes: an upper case supported on a hull; a lower case pivotably supported on the upper case; a first drive source disposed within the upper case; a planetary gear mechanism connected to the first drive source via an upper drive shaft; a propeller shaft connected to the planetary gear mechanism via a lower drive shaft; and a second drive source that provides the lower case with a torque. The planetary gear mechanism includes a sun gear, a planetary carrier supporting planetary gears and connected to an upper end of the lower drive shaft, and an internal gear. One of the sun gear and the internal gear is connected to the lower end of the upper drive shaft, and the other is connected to the lower case to provide the lower case with a torque in a direction opposite to a rotation direction of the lower drive shaft.

7 Claims, 8 Drawing Sheets

(51) Int. Cl.
*B63H 20/30* (2006.01)
*B63H 23/14* (2006.01)
*B63H 23/30* (2006.01)
*F02M 35/16* (2006.01)

(56) References Cited

OTHER PUBLICATIONS

Office Action for German Patent Application No. 102022101824.5 dated Sep. 27, 2023; 16 pp.

* cited by examiner

OUTBOARD MOTOR

TECHNICAL FIELD

The present invention relates to an outboard motor.

BACKGROUND ART

JP5293335B2 discloses an outboard motor including: a drive source including an internal combustion engine and a motor generator provided in a hull; a drive shaft connected to the output shaft of the drive source via a bevel gear and extending vertically; a lower case receiving a lower portion of the drive shaft; a propeller shaft connected to the lower end of the drive shaft via a bevel gear and extending horizontally in the lower case; and a propeller provided at an end portion of the propeller shaft protrude out from the lower case. The lower case is supported on the hull to be pivotable about the drive shaft and the angle thereof relative to the hull is changed by an electric hydraulic cylinder. In such an outboard motor, only the lower case is pivoted when the steering angle is changed, and therefore, the installation space of the outboard motor can be reduced.

In the outboard motor disclosed in JP5293335B2, because the propeller shaft is perpendicularly coupled with the drive shaft via the bevel gear and the propeller shaft is supported by the lower case, the torque of the drive shaft is applied to the lower case via the propeller shaft in a direction to rotate the lower case. Therefore, it is necessary to supply electric power to the electric hydraulic cylinder at all times to maintain the steering angle, namely, the angle of the lower case relative to the hull, constant, and this leads to energy loss.

SUMMARY OF THE INVENTION

In view of the foregoing background, a primary object of the present invention is to reduce energy loss in an outboard motor.

To achieve the above object, one aspect of the present invention provides an outboard motor (1), comprising: an upper case (3) configured to be supported on a hull (2); a lower case (4) supported on a lower portion of the upper case to be pivotable about a first axis (A) that extends vertically; a first drive source (15) disposed within the upper case; an upper drive shaft (17) that is rotatably supported by the upper case and extends along the first axis to be connected to an output shaft of the first drive source at an upper end thereof; a planetary gear mechanism (20) disposed along the first axis inside the upper case or the lower case and connected to a lower end of the upper drive shaft; a lower drive shaft (18) that is rotatably supported by the lower case, extends along the first axis to be connected to the planetary gear mechanism at an upper end thereof, and is provided with a first bevel gear (24) at a lower end thereof; a propeller shaft (23) that is rotatably supported by the lower case, extends in a direction perpendicular to the first axis, is provided at one end thereof with a second bevel gear engaging with the first bevel gear, and is provided with a propeller (26) at another end thereof that protrudes out from the lower case; and a second drive source (31) that provides the lower case with a torque about the first axis, wherein the planetary gear mechanism includes a sun gear (35), a planetary carrier (37) that rotatably supports multiple planetary gears (36) engaging with the sun gear, and an internal gear (38) engaging with the multiple planetary gears, the planetary carrier is connected to an upper end of the lower drive shaft, one of the sun gear and the internal gear is connected to the lower end of the upper drive shaft, and another of the sun gear and the internal gear is connected to the lower case so as to provide the lower case with a torque in a direction opposite to a rotation direction of the lower drive shaft.

According to this aspect, a torque in the direction opposite to the rotation direction of the lower drive shaft is applied to the lower case from the sun gear or the internal gear. This cancels out at least part of the torque applied to the lower case from the lower drive shaft via the propeller shaft. Therefore, it is possible to reduce the driving force that the second drive source should generate to maintain the angle of the lower case relative to the upper case. Namely, it is possible to reduce energy loss in the outboard motor.

In the above aspect, preferably, the planetary gear mechanism is disposed within the upper case, the sun gear is connected to the lower end of the upper drive shaft, and the internal gear is connected to the lower case.

According to this aspect, the lower case can be made compact in size.

In the above aspect, preferably, the internal gear is fixed to the lower case.

According to this aspect, it is possible to connect the internal gear to the lower case with a simple configuration.

In the above aspect, preferably, the internal gear and the lower case are connected to each other by a transmission mechanism (101) with a predetermined speed ratio.

According to this aspect, the torque transmitted from the internal gear to the lower case can be adjusted.

In the above aspect, preferably, the speed ratio is set to satisfy a following relationship:

speed ratio=1+1/(planetary gear ratio−1)

planetary gear ratio=(Za+Zc)/Za, wherein Za is a number of teeth of the sun gear and Zc is a number of teeth of the internal gear.

According to this aspect, the torque transmitted from the internal gear to the lower case is balanced with the torque transmitted from the lower drive shaft to the lower case via the propeller shaft. Thereby, it is possible to minimize the driving force that the second drive source should generate to maintain the angle of the lower case.

In the above aspect, preferably, the multiple planetary gears include multiple inner planetary gears engaging with the sun gear and multiple outer planetary gears each engaging with a corresponding one of the inner planetary gears and the internal gear and having a same number of teeth as each inner planetary gear, and the speed ratio is set to satisfy a following relationship:

speed ratio=1−1/(planetary gear ratio+1)

planetary gear ratio=(Zc−Za)/Za, wherein Za is a number of teeth of the sun gear and Zc is a number of teeth of the internal gear.

According to this aspect, the torque transmitted from the internal gear to the lower case is balanced with the torque transmitted from the lower drive shaft to the lower case via the propeller shaft. Thereby, it is possible to minimize the driving force that the second drive source should generate to maintain the angle of the lower case.

According to another aspect of the present invention, there is provided an outboard motor (400), comprising: an upper case (3) configured to be supported on a hull (2); a lower case (4) supported on a lower portion of the upper case to be pivotable about a first axis (A) that extends vertically; a first drive source (15) disposed within the upper case; an upper drive shaft (17) that is rotatably supported by the upper case and extends along the first axis to be connected to an output shaft of the first drive source at an upper end thereof; a planetary gear mechanism (20) disposed along the first axis inside the upper case or the lower case and connected to a lower end of the upper drive shaft; a lower drive shaft (18) that is rotatably supported by the lower case, extends along the first axis to be connected to the planetary gear mechanism at an upper end thereof via a synchronization mechanism (420), and is provided with a first bevel gear (24) at a lower end thereof; a propeller shaft (431) that is rotatably supported by the lower case, extends in a direction perpendicular to the first axis, is provided at one end thereof with a second bevel gear (435) engaging with the first bevel gear, and is provided with a propeller (437) at another end thereof that protrudes out from the lower case; and a second drive source (31) that provides the lower case with a torque about the first axis, wherein the planetary gear mechanism includes a first sun gear (402), a planetary carrier (406) that rotatably supports multiple first planetary gears (403) engaging with the first sun gear, multiple second planetary gears (404) provided to be coaxial with the respective first planetary gears and to rotate integrally with the respective first planetary gears, and multiple third planetary gears (405) respectively engaging with the second planetary gears, an internal gear (38) engaging with the multiple first planetary gears, and a second sun gear (407) disposed to be coaxial with the first sun gear and engaging with the multiple third planetary gears, the first sun gear is connected to the lower end of the upper drive shaft, the internal gear is connected to the lower case so as to provide the lower case with a torque in a direction opposite to a rotation direction of the lower drive shaft, and the synchronization mechanism is capable of taking a first state to connect the planetary carrier to the lower drive shaft and a second state to connect the second sun gear to the lower drive shaft.

According to this aspect, it is possible to reduce energy loss in the outboard motor provided with the synchronization mechanism which can change the rotation direction of the propeller shaft.

In the above aspect, preferably, the internal gear and the lower case are connected to each other by a transmission mechanism (101) with a predetermined speed ratio, and the speed ratio is set to satisfy a following relationship:

the speed ratio=1+1/(the planetary gear ratio−1)

the planetary gear ratio=($Za+Zc$)/$Za$, wherein $Za$ is a number of teeth of the first sun gear and $Zc$ is a number of teeth of the internal gear.

According to this aspect, in the first state, the torque transmitted from the internal gear to the lower case is balanced with the torque transmitted from the lower drive shaft to the lower case via the propeller shaft. Thereby, it is possible to minimize the driving force that the second drive source should generate to maintain the angle of the lower case.

In the above aspect, preferably, the internal gear and the lower case are connected to each other by a transmission mechanism (101) with a predetermined speed ratio, and the speed ratio is set to satisfy a following relationship:

speed ratio=1−1/(planetary gear ratio−1)

planetary gear ratio=($Zp1/Zc+Zp1/Za1$)/($Zp2/Za2−Zp1/Zc$), wherein $Za1$ is a number of teeth of the first sun gear, $Za2$ is a number of teeth of the second sun gear, $Zc$ is a number of teeth of the internal gear, $Zp1$ is a number of teeth of each first planetary gear, and $Zp2$ is a number of teeth of each second planetary gear.

According to this aspect, in the second state, the torque transmitted from the internal gear to the lower case is balanced with the torque transmitted from the lower drive shaft to the lower case via the propeller shaft. Thereby, it is possible to minimize the driving force that the second drive source should generate to maintain the angle of the lower case.

In the above aspect, preferably, the number of teeth of each first planetary gear is equal to the number of teeth of each second planetary gear.

According to this aspect, the structures of the first planetary gears and the second planetary gears can be simplified.

According to the foregoing configuration, it is possible to reduce energy loss in an outboard motor.

DETAILED DESCRIPTION OF THE INVENTION

First Embodiment

Figure 1:
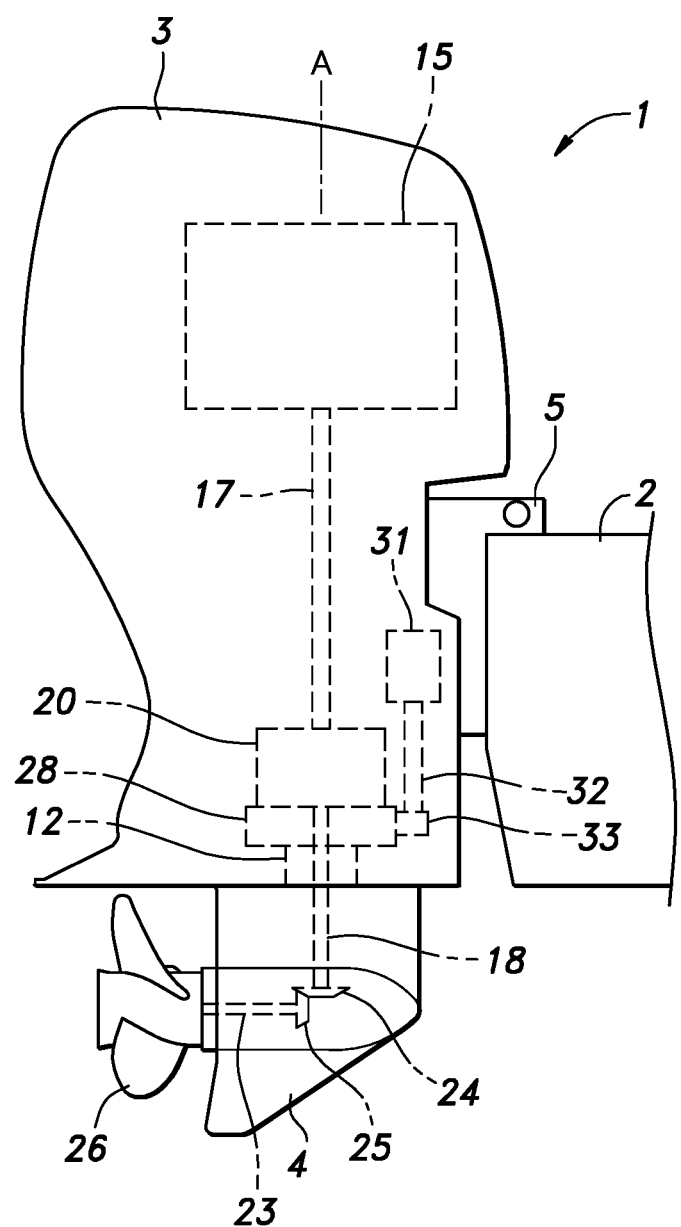
FIG. 1 is a schematic diagram of an outboard motor according to the first embodiment of the present invention.
Figure 2:
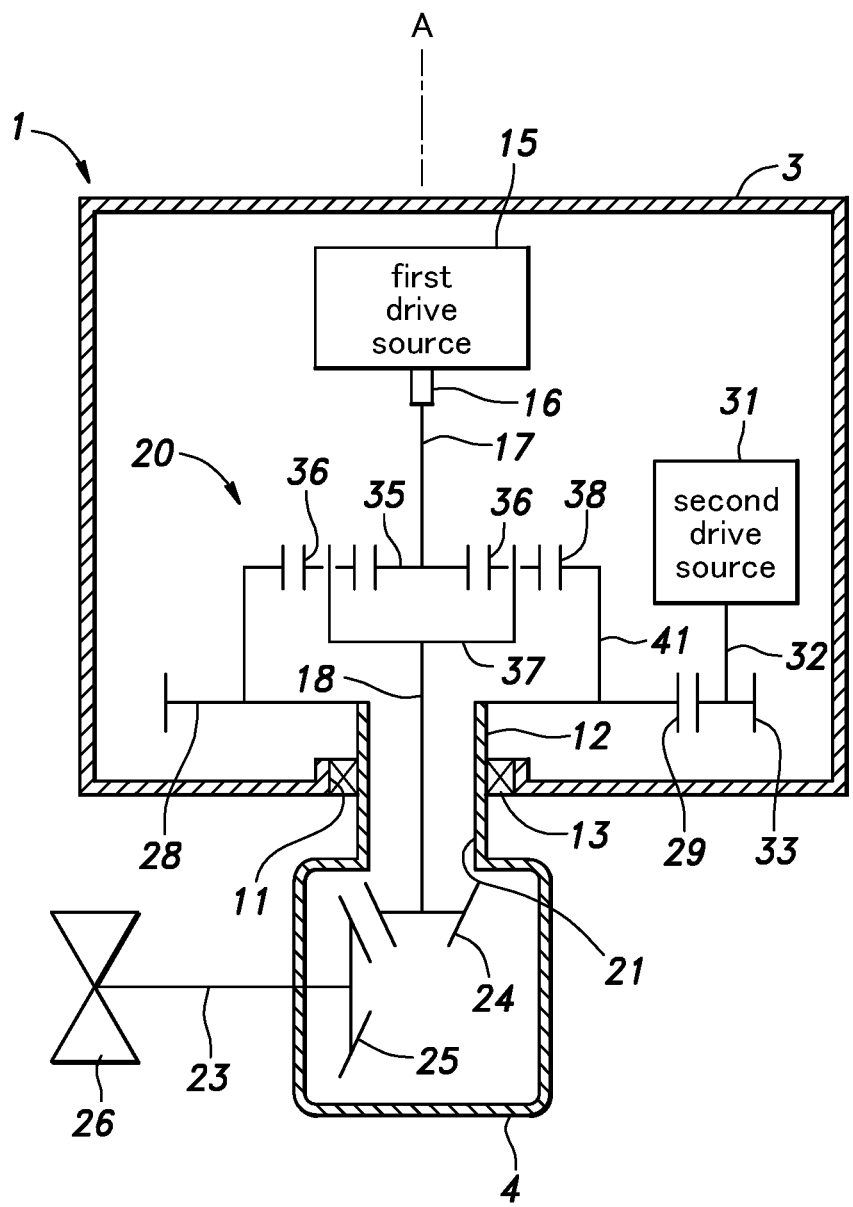
FIG. 2 is an explanatory diagram of the outboard motor according to the first embodiment.

In the following, an outboard motor 1 according to the first embodiment of the present invention will be described with reference to the drawings. As shown in FIGS. 1 and 2, the outboard motor 1 includes an upper case 3 supported on a hull 2 and a lower case 4 supported on a lower portion of the upper case 3. Preferably, a bracket 5 is provided on the stern of the hull 2 and the upper case 3 is supported on the hull 2 via the bracket 5. Preferably, the bracket 5 includes a hinge and is attached to the hull 2 so as to be pivotable about a laterally extending axis. The upper case 3 is preferably supported on the hull 2 by the bracket 5 so as to be pivotable about the laterally extending axis.

The lower case 4 is supported on the lower portion of the upper case 3 to be pivotable about a first axis A that extends vertically. The lower end of the upper case 3 is formed with a bearing hole 11 that extends from inside to outside of the upper case 3 along the first axis A. The upper end of the lower case 4 is provided with a cylindrical connecting part 12. The connecting part 12 is rotatably supported in the bearing hole 11 via a bearing 13. The connecting part 12 is disposed coaxially with the first axis A. The bearing 13 is an angular contact ball bearing, for example, and preferably restricts movement of the connecting part 12 in a direction along the first axis A relative to the bearing hole 11. Preferably, a seal member is provided between the connecting part 12 and the bearing hole 11 to prevent intrusion of water. Preferably, the lower portion of the lower case 4 is formed in a bullet shape facing forward.

A first drive source 15 is disposed inside the upper case 3. The first drive source 15 is used for the outboard motor 1 to generate thrust. The first drive source 15 may be an internal combustion engine or an electric motor. In the present embodiment, the first drive source 15 is an electric motor. The first drive source 15 is fixed to the upper case 3 such that an output shaft 16 of the first drive source 15 extends along the first axis A.

An upper drive shaft 17 is connected to the output shaft 16 of the first drive source 15. The upper portion drive shaft 17 is rotatably supported by the upper case 3 and extends along the first axis A. Preferably, the lower end of the output shaft 16 of the first drive source 15 is joined to the upper end of the upper drive shaft 17 by a coupling or the like so that they rotate integrally.

Below the upper drive shaft 17, a lower drive shaft 18 is disposed along the first axis A. The lower drive shaft 18 is rotatably supported by at least the lower case 4. The lower end of the upper portion drive shaft 17 and the upper end of the lower drive shaft 18 are connected to each other via a planetary gear mechanism 20. The planetary gear mechanism 20 transmits the rotation of the upper drive shaft 17 to the lower drive shaft 18 with changed rotation speed. The planetary gear mechanism 20 is disposed along the first axis A inside the upper case 3 or the lower case 4. In the present embodiment, the planetary gear mechanism 20 is disposed inside the upper case 3. Also, the lower drive shaft 18 passes through the inner hole 21 of the connecting part 12 and the upper end of the lower drive shaft 18 is disposed within the upper case 3. Preferably, the lower drive shaft 18 is rotatably supported in the inner hole 21 of the connecting part 12 via a bearing.

The lower case 4 rotatably supports a propeller shaft 23 extending in a direction perpendicular to the first axis A. The propeller shaft 23 extends in the fore and aft direction and penetrates through the rear end of the lower case 4. The propeller shaft 23 has a front end disposed inside the lower case 4 and a rear end disposed outside the lower case 4. The lower end of the lower drive shaft 18 is provided with a first bevel gear 24, and the front end of the propeller shaft 23 is provided with a second bevel gear 25 engaging with the first bevel gear 24. Due to the engagement between the first bevel gear 24 and the second bevel gear 25, the propeller shaft 23 rotates when the lower drive shaft 18 rotates. The rear end of the propeller shaft 23 is provided with a propeller 26.

The upper end of the connecting part 12 is provided with a disc part 28 that protrudes radially outward. The disc part 28 is disposed inside the upper case 3. The disc part 28 is formed in a circular shape having a center on the first axis A and has a through hole formed at the center to communicate with the inner hole 21 of the connecting part 12. The outer circumference of the disc part 28 is formed with a first gear 29 which is an external gear.

The upper case 3 accommodates a second drive source 31 that provides the lower case 4 with a torque about the first axis A. The second drive source 31 generates a driving force for causing the lower case 4 to pivot relative to the upper case 3. The second drive source 31 may be an internal combustion engine or an electric motor. In the present embodiment, the second drive source 31 is an electric motor. The second drive source 31 is fixed to the upper case 3 and an output shaft 32 of the second drive source 31 extends downward in parallel with the first axis A. The output shaft 32 of the second drive source 31 is provided with a second gear 33, which is an external gear, so as to engage with the first gear 29. When the output shaft 32 of the second drive source 31 rotates, the lower case 4 pivots about the first axis A relative to the upper case 3 due to the engagement between the second gear 33 and the first gear 29.

The planetary gear mechanism 20 includes a sun gear 35, a planetary carrier 37 that rotatably supports multiple planetary gears 36 engaging with the sun gear 35, and an internal gear 38 engaging with the multiple planetary gears 36. The sun gear 35, the planetary carrier 37, and the internal gear 38 are disposed coaxially to each other with the first axis A being the center. Each of the sun gear 35, the planetary carrier 37, and the internal gear 38 is disposed to be rotatable about the first axis A.

The planetary carrier 37 is connected to the upper end of the lower drive shaft 18. Namely, the planetary carrier 37 rotates integrally with the lower drive shaft 18. One of the sun gear 35 and the internal gear 38 is connected to the lower end of the upper drive shaft 17 and the other of the sun gear 35 and the internal gear 38 is connected to the lower case 4 so as to provide the lower case 4 with a torque in a direction opposite to the rotation direction of the lower drive shaft 18. In the present embodiment, the sun gear 35 is connected to the lower end of the upper drive shaft 17 and the internal gear 38 is connected to the lower case 4. The sun gear 35 rotates integrally with the upper drive shaft 17.

In the first embodiment, the internal gear 38 is fixed to the lower case 4 and rotates integrally with the lower case 4. The internal gear 38 is joined to the disc part 28 of the lower case 4 by a tubular connection member 41. The connection member 41 may be joined to the connecting part 12 instead of the disc part 28. The planetary carrier 37 is disposed inside the connection member 41.

In the outboard motor 1 according to the first embodiment, the torque generated by the first drive source 15 is transmitted to the propeller shaft 23 via the upper drive shaft 17, the planetary gear mechanism 20, and the lower drive shaft 18, whereby the propeller 26 rotates to generate thrust. The planetary gear mechanism 20 transmits the torque of the upper drive shaft 17 to the lower drive shaft 18 with reduced rotation speed. At this time, the torque of the lower drive shaft 18 is transmitted to the lower case 4 via the propeller shaft 23. On the other hand, the torque of the internal gear 38, which rotates in the opposite direction relative to the lower drive shaft 18 and the planetary carrier 37, is transmitted to the lower case 4. As a result, at least part of the torque transmitted from the planetary carrier 37 to the lower case 4 is canceled out by the torque transmitted from the internal gear 38 to the lower case 4. Therefore, it is possible to reduce the torque that the second drive source 31 should apply to the lower case 4 to maintain the angle of the lower case 4 relative to the upper case 3, i.e., the steering angle. As a result, the amount of energy consumption of the second drive source 31 can be reduced. Thus, energy loss in the outboard motor 1 can be reduced.

In the outboard motor 1 according to the first embodiment, the torque applied to the lower case 4 from the planetary gear mechanism 20 is a subtraction of the torque of the internal gear 38 from the torque of the planetary carrier 37 and is equal to the torque of the sun gear 35. In contrast, in a case where the internal gear 38 is connected to the upper case 3 instead of being connected to the lower case 4, the torque applied to the lower case 4 from the planetary gear mechanism 20 is equal to the torque of the planetary carrier 37.

The provision of the planetary gear mechanism 20 in the upper case 3 allows the lower case 4 to be compact in size. This can reduce the resistance (drag) that the outboard motor 1 receives from water. Also, since the internal gear 38 is fixed to the lower case 4, the internal gear 38 and the lower case 4 can be connected to each other with a simple configuration. This also contributes to the reduction in size of the outboard motor 1.

Second Embodiment

Figure 3:
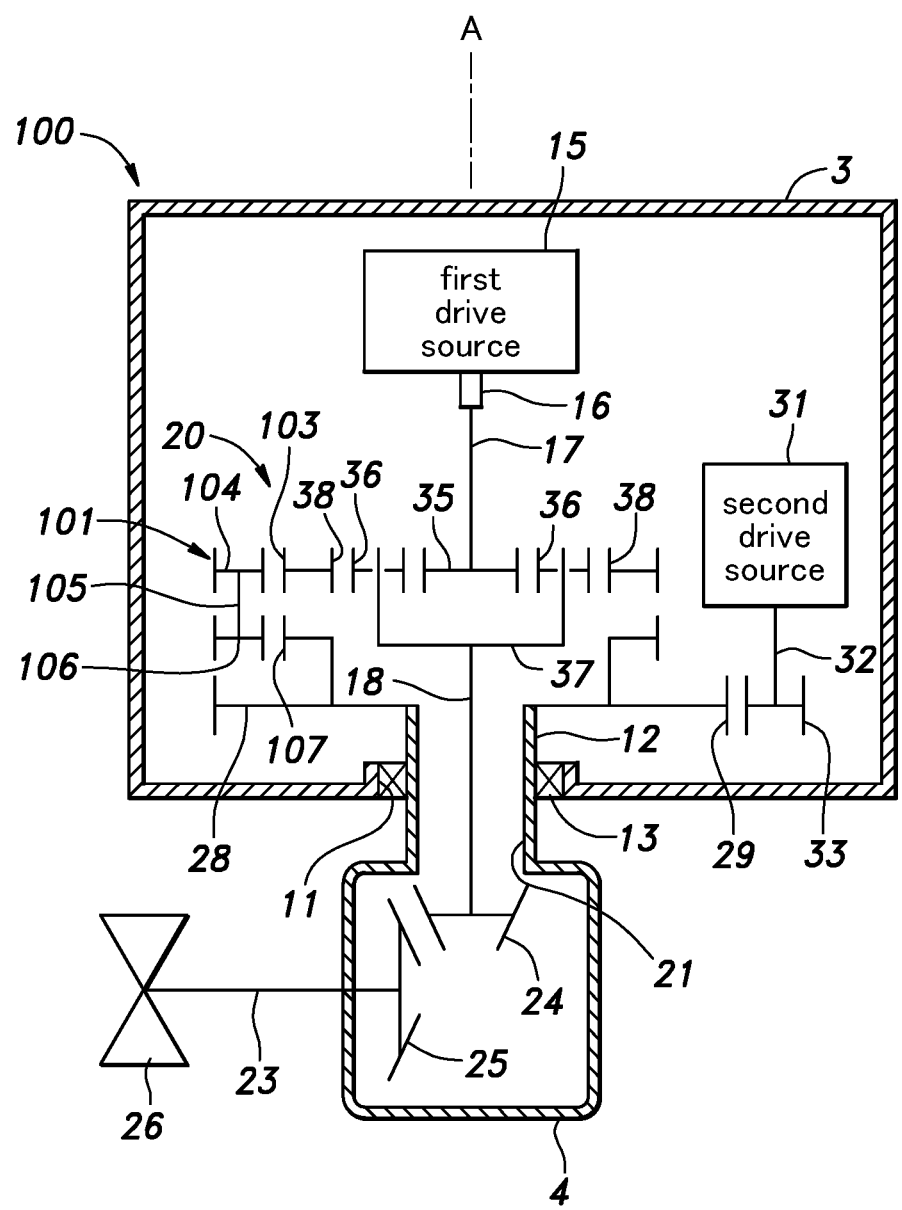
FIG. 3 is an explanatory diagram of an outboard motor according to the second embodiment of the present invention.

An outboard motor 100 according to the second embodiment differs from the outboard motor 1 according to the first embodiment only with respect to the connection structure between the internal gear 38 and the lower case 4 and the other configuration is the same. In the following description, elements same as or similar to those of the outboard motor 1 according to the first embodiment will be denoted by same reference signs and redundant description will not be repeated. As shown in FIG. 3, in the outboard motor 100 according to the second embodiment, the internal gear 38 and the lower case 4 are connected to each other by a transmission mechanism 101 with a predetermined speed ratio.

The transmission mechanism 101 includes a third gear 103 which is an external gear formed on the outer circumferential portion of the internal gear 38, a fourth gear 104 which is an external gear engaging with the third gear 103, a fifth gear 106 which is an external gear connected to the fourth gear 104 via a shaft 105 to rotate integrally with the fourth gear 104, and a sixth gear 107 which is an external gear provided on the disc part 28 and having a center on the first axis A. The shaft 105 extends in parallel with the first axis A and is rotatably supported by the upper case 3. The speed ratio of the transmission mechanism 101 can be changed by adjusting the number of teeth of the third to sixth gears 103, 104, 106, 107.

The speed ratio of the transmission mechanism 101 is set to satisfy the following relationship:

speed ratio=1+1/(planetary gear ratio−1)

planetary gear ratio=(Za+Zc)/Za, wherein Za is the number of teeth of the sun gear 35 and Zc is the number of teeth of the internal gear 38. According to this configuration, the torque transmitted from the internal gear 38 to the lower case 4 is balanced with the torque transmitted from the lower drive shaft 18 to the lower case 4 via the propeller shaft 23. Thereby, it is possible to minimize the driving force that the second drive source 31 should generate to maintain the angle of the lower case 4.

Third Embodiment

Figure 4:
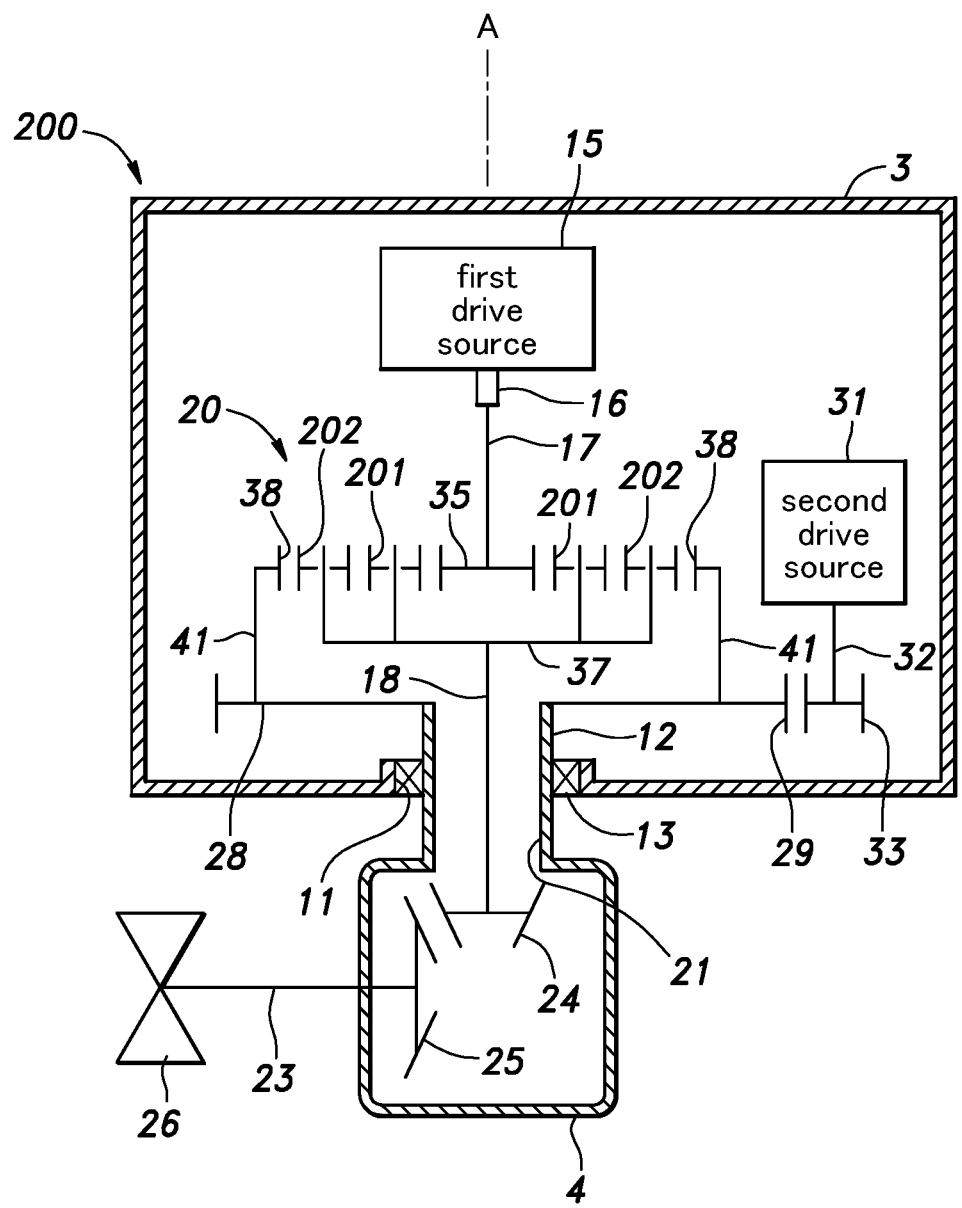
FIG. 4 is an explanatory diagram of an outboard motor according to the third embodiment of the present invention.
Figure 5:
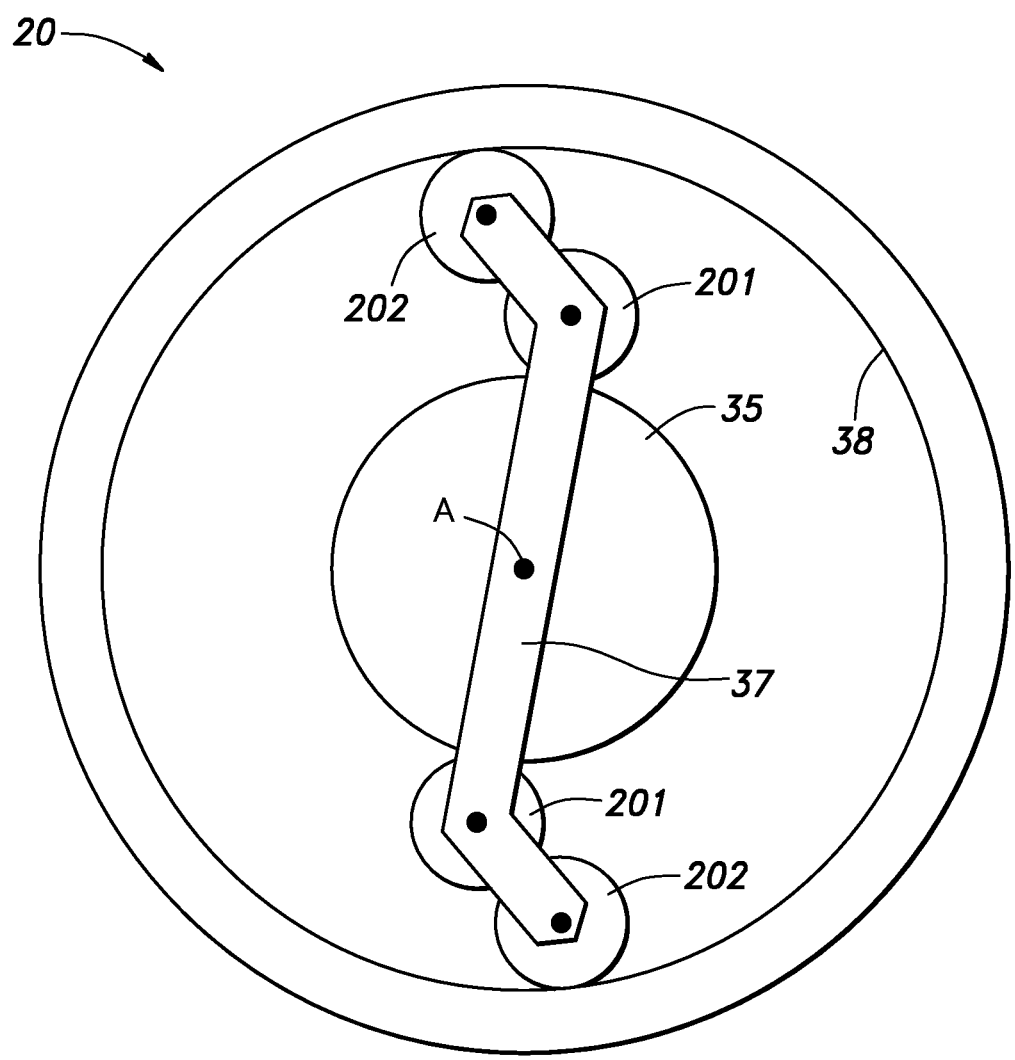
FIG. 5 is an explanatory diagram of a planetary gear mechanism of an outboard motor according to the third embodiment.

An outboard motor 200 according to the third embodiment differs from the outboard motor 1 according to the first embodiment only with respect to the configuration of the planetary gears 36 and the planetary carrier 37 and the other configuration is the same. As shown in FIGS. 4 and 5, in the outboard motor 200 according to the second embodiment, the planetary gears 36 include multiple inner planetary gears 201 engaging the sun gear 35 and multiple outer planetary gears 202 each engaging with a corresponding one of the inner planetary gears 201 and the internal gear 38 and having the same number of teeth as each inner planetary gear 201. The number of inner planetary gears 201 is the same as the number of outer planetary gears 202. Each of the multiple inner planetary gears 201 and the multiple outer planetary gears 202 is disposed in parallel with the first axis A and is rotatably supported by the planetary carrier 37. The planetary carrier 37 of the outboard motor according to the third embodiment 1 rotates in the opposite direction compared to the planetary carrier 37 of the outboard motor 1 according to the first embodiment.

In the outboard motor 200 according to the third embodiment, the torque applied to the lower case 4 from the planetary gear mechanism 20 is a subtraction of the torque of the planetary carrier 37 from the torque of the internal gear 38 and is equal to the torque of the sun gear 35.

Fourth Embodiment

Figure 6:
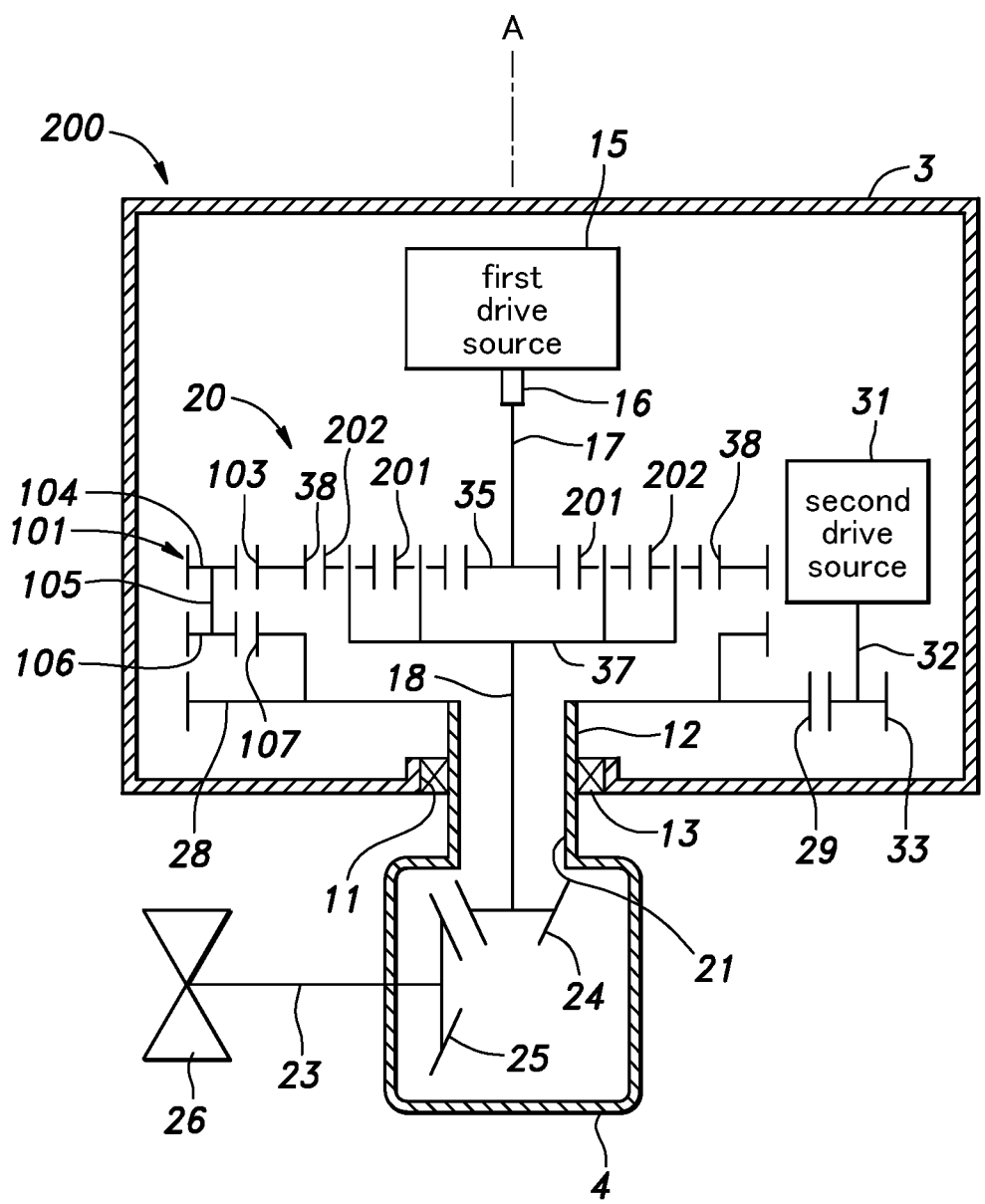
FIG. 6 is an explanatory diagram of an outboard motor according to the fourth embodiment of the present invention.

An outboard motor 300 according to the fourth embodiment differs from the outboard motor 200 according to the third embodiment only with respect to the connection structure between the internal gear 38 and the lower case 4 and the other configuration is the same. As shown in FIG. 6, in the outboard motor 300 according to the fourth embodiment, the internal gear 38 is connected to the lower case 4 by a transmission mechanism 101 with a predetermined speed ratio.

The transmission mechanism 101 includes a third gear 103 which is an external gear formed on the outer circumferential portion of the internal gear 38, a fourth gear 104 which is an external gear engaging with the third gear 103, a fifth gear 106 which is an external gear connected to the fourth gear 104 via a shaft 105 to rotate integrally with the fourth gear 104, and a sixth gear 107 which is an external gear provided on the disc part 28 and having a center on the first axis A. The shaft 105 extends in parallel with the first axis A and is rotatably supported by the upper case 3. The speed ratio of the transmission mechanism 101 can be changed by adjusting the number of teeth of the third to sixth gears 103, 104, 106, 107.

The speed ratio of the transmission mechanism 101 is set to satisfy the following relationship:

speed ratio=1−1/(planetary gear ratio+1)

planetary gear ratio=(Zc−Za)/Za, wherein Za is the number of teeth of the sun gear 35 and Zc is the number of teeth of the internal gear 38. According to this configuration, the torque transmitted from the internal gear 38 to the lower case 4 is balanced with the torque transmitted from the lower drive shaft 18 to the lower case 4 via the propeller shaft 23. Thereby, it is possible to minimize the driving force that the second drive source 31 should generate to maintain the angle of the lower case 4.

Fifth Embodiment

Figure 7:
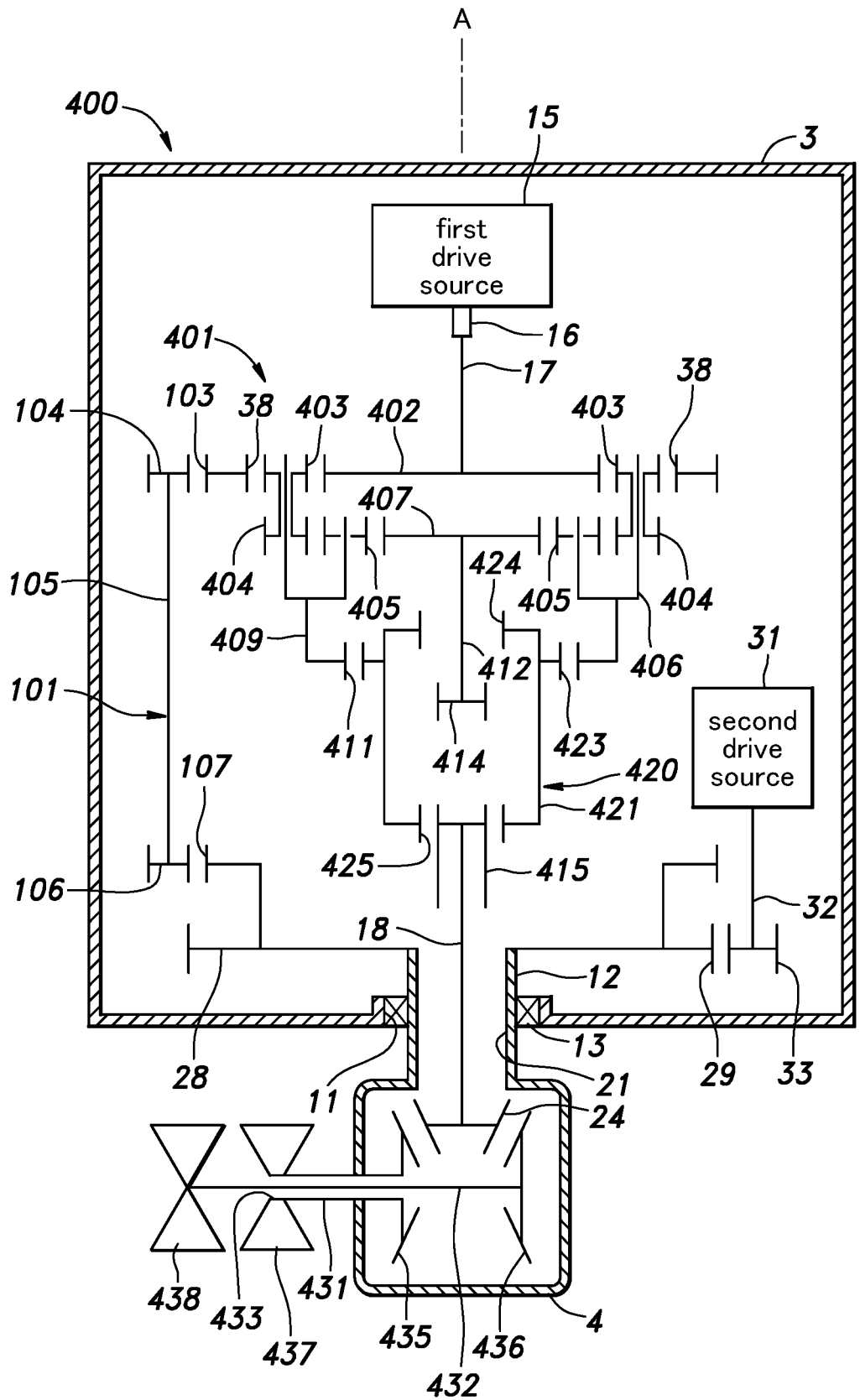
FIG. 7 is an explanatory diagram of the outboard motor according to the fifth embodiment and shows a first state of a synchronization mechanism.

An outboard motor 400 according to the fifth embodiment is a partial modification of the outboard motor 100 according to the second embodiment. As shown in FIG. 7, in the outboard motor 400 according to the fifth embodiment, the first drive source 15 consists of an internal combustion engine.

A planetary gear mechanism 401 of the outboard motor 400 according to the fifth embodiment includes a first sun gear 402, a planetary carrier 406 that rotatably supports multiple first planetary gears 403 engaging with the first sun gear 402, multiple second planetary gears 404 provided to be coaxial with the respective first planetary gears 403 and to rotate integrally with the respective first planetary gears 403, and multiple third planetary gears 405 respectively engaging with the second planetary gears 404, an internal gear 38 engaging with the multiple first planetary gears 403, and a second sun gear 407 disposed to be coaxial with the first sun gear 402 and engaging with the multiple third planetary gears 405. Each of the first sun gear 402, the planetary carrier 406, the internal gear 38, and the second sun gear 407 is disposed to be rotatable about the first axis A. The first sun gear 402 is connected to the lower end of the upper drive shaft 17.

The number of teeth of each first planetary gear 403 may be equal to the number of teeth of each second planetary gear 404. This can simplify the structures of the first planetary gears and the second planetary gears. The multiple third planetary gears 405 are disposed at positions below the first sun gear 402 and overlapping with the first sun gear 402 as viewed in the direction along the first axis A. The multiple third planetary gears 405 engage with the corresponding second planetary gears 404. The number of teeth of each first planetary gear 403 may be equal to or different from the number of teeth of each second planetary gear 404. In the case where the number of teeth of each first planetary gear 403 is equal to the number of teeth of each second planetary gear 404, the structures of the first planetary gears and the second planetary gears can be simplified.

The planetary carrier 406 includes a cylindrical first sleeve 409 that extends downward. The first sleeve 409 is dispose coaxially with the first axis A. Preferably, the planetary carrier 406 is rotatably supported by the upper case 3 at the first sleeve 409. The lower end of the first sleeve 409 is provided with a first coupling gear 411 disposed in the circumferential direction about the first axis A. In the present embodiment, the first coupling gear 411 is an internal gear formed on an inner circumferential surface of the first sleeve 409. In another embodiment, the first coupling gear 411 may be an external gear formed on an outer circumferential surface of the first sleeve 409.

The second sun gear 407 is joined to the upper end of an intermediate drive shaft 412 extending along the first axis A. The intermediate drive shaft 412 is rotatably supported by the upper case 3. The intermediate drive shaft 412 is disposed inside the first sleeve 409. The lower end of the intermediate drive shaft 412 is provided with a second coupling gear 414 which is an external gear. The second sun gear 407 and the second coupling gear 414 are disposed coaxially with each other. The second sun gear 407, the intermediate drive shaft 412, and the second coupling gear 414 rotate integrally.

The upper end of the lower drive shaft 18 is a free end. The upper end of the lower drive shaft 18 is provided with a third coupling gear 415 which is an external gear. The upper portion of the lower drive shaft 18 is connected to the planetary gear mechanism 401 via a synchronization mechanism 420. The synchronization mechanism 420 includes a cylindrical second sleeve 421 that extends along the first axis A and is supported by the upper case 3 to be rotatable about the first axis A. An outer circumferential surface of the second sleeve 421 is formed with a fourth coupling gear 423 which is an external gear having a center on the first axis A. An upper portion of the inner circumferential surface of the second sleeve 421 is formed with a fifth coupling gear 424 which is an internal gear having a center on the first axis A. A lower portion of the inner circumferential surface of the second sleeve 421 is formed with a sixth coupling gear 425 which is an internal gear having a center on the first axis A.

The synchronization mechanism 420 can take a first state to connect the planetary carrier 406 to the lower drive shaft 18 and a second state to connect the second sun gear 407 to the lower drive shaft 18. Also, the synchronization mechanism 420 can take a neutral state in which the lower drive shaft 18 is connected to neither of the planetary carrier 406 and the second sun gear 407. In the present embodiment, the second sleeve 421 is provided to be slidably movable in the direction along the first axis A, so that the first state, the second state, and the neutral state of the synchronization mechanism 420 can be switchably selected by the movement of the second sleeve 421. Upon switching of the synchronization mechanism 420 from the first state to the second state, the rotation direction of the lower drive shaft 18 is reversed.

Figure 8:
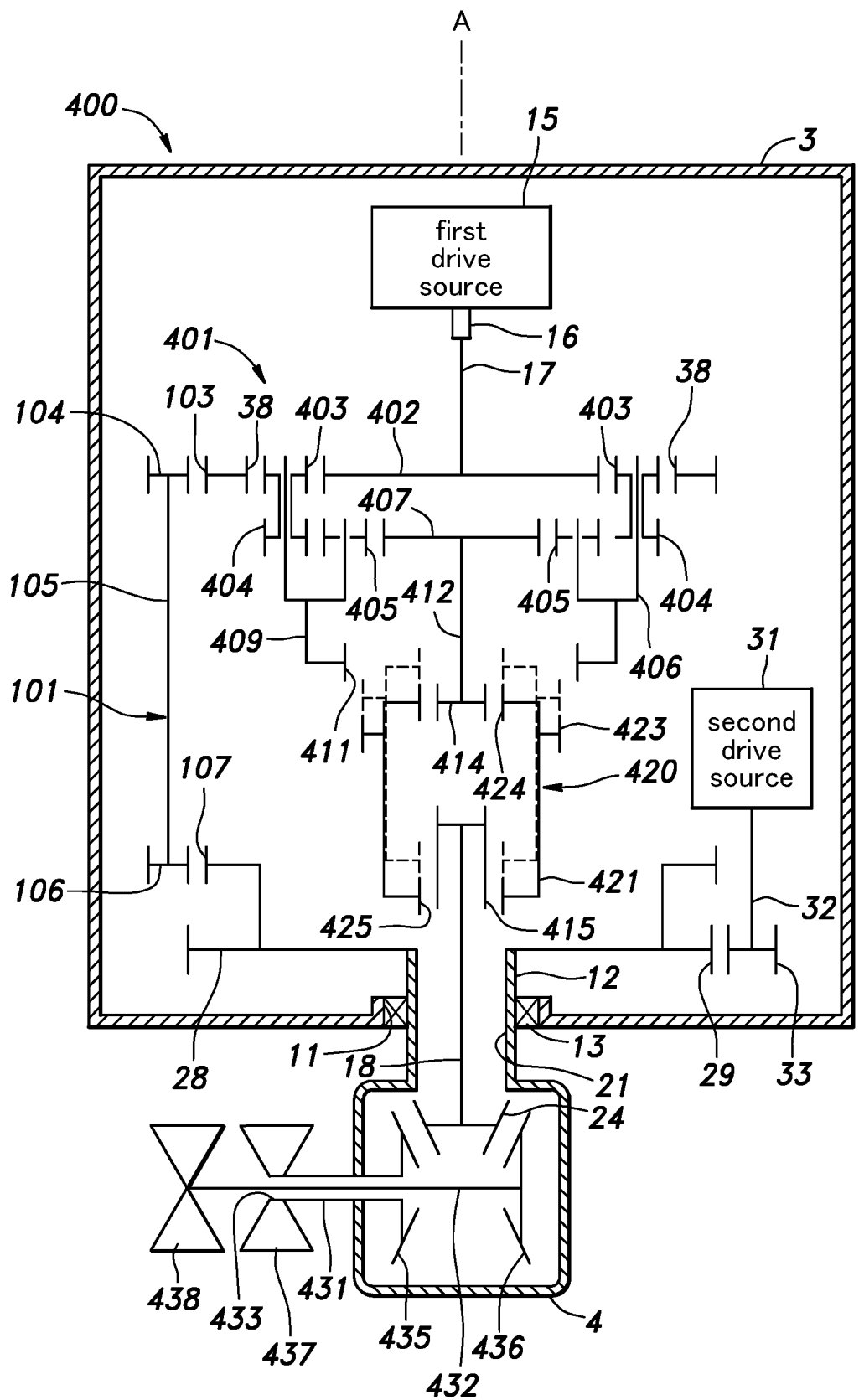
FIG. 8 is an explanatory diagram of the outboard motor according to the fifth embodiment and shows a second state of the synchronization mechanism by solid lines and a neutral state of the synchronization mechanism by broken lines.

As shown in FIG. 7, in the first state, the second sleeve 421 is in the first position, the first coupling gear 411 engages with the fourth coupling gear 423, the third coupling gear 415 engages with the sixth coupling gear 425, and the second coupling gear 414 and the fifth coupling gear 424 are disengaged from each other. As shown by solid lines in FIG. 8, in the second state, the second sleeve 421 is in the second position lower than the first position, the second coupling gear 414 engages with the fifth coupling gear 424, the third coupling gear 415 engages with the sixth coupling gear 425, and the first coupling gear 411 and the fourth coupling gear 423 are disengaged from each other. As shown by broken lines in FIG. 8, in the neutral state, the second sleeve 421 is between the first position and the second position, the third coupling gear 415 engages with the sixth coupling gear 425, the first coupling gear 411 and the fourth coupling gear 423 are disengaged from each other, and the second coupling gear 414 and the fifth coupling gear 424 are disengaged from each other.

The lower case 4 rotatably supports a first propeller shaft 431 and a second propeller shaft 432 extending in a direction perpendicular to the first axis A. The first propeller shaft 431 extends in the fore and aft direction and penetrates through the rear end of the lower case 4. The first propeller shaft 431 has a front end disposed inside the lower case 4 and a rear end disposed outside the lower case 4. The first propeller shaft 431 is formed to be cylindrical. The second propeller shaft 432 is rotatably supported in an inner bore 433 of the first propeller shaft 431. The second propeller shaft 432 has a front end protruding from the front end of the first propeller shaft 431 and disposed inside the lower case 4 and a rear end protruding from the rear end of the first propeller shaft 431 and disposed outside the lower case 4.

The lower end of the lower drive shaft 18 is provided with a first bevel gear 24. The front end of the first propeller shaft 431 is provided with a second bevel gear 435 engaging with the first bevel gear 24. The front end of the second propeller shaft 432 is provided with a third bevel gear 436 engaging with the first bevel gear 24. The rear end of the first propeller shaft 431 is provided with a first propeller 437. The rear end of the second propeller shaft 432 is provided with a second propeller 438. The first propeller shaft 431 and the second propeller shaft 432 are rotated in mutually opposite directions.

In the outboard motor 400 according to the fifth embodiment, it is possible to reduce energy loss in the outboard motor 400 provided with the synchronization mechanism 420 which can change the rotation directions of the first and second propeller shafts 431, 432.

In the outboard motor 400 according to the fifth embodiment, the speed ratio of the transmission mechanism 101 is preferably set to satisfy the following relationship:

speed ratio=1+1/(planetary gear ratio−1)

planetary gear ratio=(Za+Zc)/Za, wherein Za is the number of teeth of the first sun gear 402 and Zc is the number of teeth of the internal gear 38. Note that the synchronization mechanism 420 causes the lower drive shaft 18 to rotate at the same speed as that of the planetary carrier 406. According to this configuration, in the first state, the torque transmitted from the internal gear 38 to the lower case 4 is balanced with the torque transmitted from the lower drive shaft 18 to the lower case 4 via the propeller shafts 431, 432. Thereby, it is possible to minimize the driving force that the second drive source 31 should generate to maintain the angle of the lower case 4.

Also, in the outboard motor 400 according to the fifth embodiment, the speed ratio of the transmission mechanism 101 may be set to satisfy the following relationship:

speed ratio=1−1/(planetary gear ratio−1)

planetary gear ratio=(Zp1/Zc+Zp1/Za1)/(Zp2/Za2−Zp1/Zc), wherein Za1 is the number of teeth of the first sun gear 402, Za2 is the number of teeth of the second sun gear 407, Zc is the number of teeth of the internal gear 38, Zp1 is the number of teeth of each first planetary gear 403, and Zp2 is the number of teeth of each second planetary gear 404. Note that the synchronization mechanism 420 causes the lower drive shaft 18 to rotate at the same speed as that of the second sun gear 407. According to this configuration, in the second state, the torque transmitted from the internal gear 38 to the lower case 4 is balanced with the torque transmitted from the lower drive shaft 18 to the lower case 4 via the propeller shafts 431, 432. Thereby, it is possible to minimize the driving force that the second drive source 31 should generate to maintain the angle of the lower case 4.

Concrete embodiments of the present invention have been described in the foregoing, but the present invention is not limited to the above embodiments and may be modified or altered in various ways. For example, in each embodiment, the upper drive shaft 17 may be configured as a part of the output shaft 16 of the first drive source 15. Also, the output shaft 32 of the second drive source 31 may be connected to the second gear 33 via a transmission member such as a shaft. The planetary gear mechanism 20 may be disposed within the lower case 4 and the upper drive shaft 17 may pass through the inner hole 21 of the connecting part 12 to extend from the upper case 3 to the inside of the lower case 4.

The invention claimed is:

1. An outboard motor, comprising:
an upper case configured to be supported on a hull;
a lower case supported on a lower portion of the upper case to be pivotable about a first axis that extends vertically;
a first drive source disposed within the upper case;
an upper drive shaft that is rotatably supported by the upper case and extends along the first axis to be connected to an output shaft of the first drive source at an upper end thereof;
a planetary gear mechanism disposed along the first axis inside the upper case or the lower case and connected to a lower end of the upper drive shaft;
a lower drive shaft that is rotatably supported by the lower case, extends along the first axis to be connected to the planetary gear mechanism at an upper end thereof, and is provided with a first bevel gear at a lower end thereof;
a propeller shaft that is rotatably supported by the lower case, extends in a direction perpendicular to the first axis, is provided at one end thereof with a second bevel gear engaging with the first bevel gear, and is provided with a propeller at another end thereof that protrudes out from the lower case; and
a second drive source that provides the lower case with a torque about the first axis,
wherein the planetary gear mechanism includes a sun gear connected to the lower end of the upper drive shaft, a planetary carrier that rotatably supports multiple planetary gears engaging with the sun gear, and an internal gear engaging with the multiple planetary gears and fixed to the lower case,
the planetary carrier is connected to an upper end of the lower drive shaft,
one of the sun gear and the internal gear is connected to the lower end of the upper drive shaft,
another of the sun gear and the internal gear is connected to the lower case so as to provide the lower case with a torque in a direction opposite to a rotation direction of the lower drive shaft, and
the planetary gear mechanism is disposed within the upper case.

2. An outboard motor, comprising:
an upper case configured to be supported on a hull;
a lower case supported on a lower portion of the upper case to be pivotable about a first axis that extends vertically;
a first drive source disposed within the upper case;
an upper drive shaft that is rotatably supported by the upper case and extends along the first axis to be connected to an output shaft of the first drive source at an upper end thereof;
a planetary gear mechanism disposed along the first axis inside the upper case or the lower case and connected to a lower end of the upper drive shaft;
a lower drive shaft that is rotatably supported by the lower case, extends along the first axis to be connected to the planetary gear mechanism at an upper end thereof, and is provided with a first bevel gear at a lower end thereof;
a propeller shaft that is rotatably supported by the lower case, extends in a direction perpendicular to the first axis, is provided at one end thereof with a second bevel gear engaging with the first bevel gear, and is provided with a propeller at another end thereof that protrudes out from the lower case; and
a second drive source that provides the lower case with a torque about the first axis,
wherein the planetary gear mechanism includes a sun gear connected to the lower end of the upper drive shaft, a planetary carrier that rotatably supports multiple planetary gears engaging with the sun gear, and an internal gear engaging with the multiple planetary gears,
the planetary carrier is connected to an upper end of the lower drive shaft,
one of the sun gear and the internal gear is connected to the lower end of the upper drive shaft, another of the sun gear and the internal gear is connected to the lower case so as to provide the lower case with a torque in a direction opposite to a rotation direction of the lower drive shaft, the planetary gear mechanism is disposed within the upper case, the internal gear and the lower case are connected to each other by a transmission mechanism with a speed ratio, and the speed ratio is set to satisfy a following relationship:

$$\text{speed ratio}=1+1/(\text{planetary gear ratio}-1)$$

$$\text{planetary gear ratio}=(Za+Zc)/Za,$$

wherein Za is a number of teeth of the sun gear and Zc is a number of teeth of the internal gear.

3. An outboard motor comprising:

an upper case configured to be supported on a hull;

a lower case supported on a lower portion of the upper case to be pivotable about a first axis that extends vertically;

a first drive source disposed within the upper case;

an upper drive shaft that is rotatably supported by the upper case and extends along the first axis to be connected to an output shaft of the first drive source at an upper end thereof;

a planetary gear mechanism disposed along the first axis inside the upper case or the lower case and connected to a lower end of the upper drive shaft;

a lower drive shaft that is rotatably supported by the lower case, extends along the first axis to be connected to the planetary gear mechanism at an upper end thereof via a synchronization mechanism, and is provided with a first bevel gear at a lower end thereof;

a propeller shaft that is rotatably supported by the lower case, extends in a direction perpendicular to the first axis, is provided at one end thereof with a second bevel gear engaging with the first bevel gear, and is provided with a propeller at another end thereof that protrudes out from the lower case; and a second drive source that provides the lower case with a torque about the first axis, wherein the planetary gear mechanism includes a first sun gear, a planetary carrier that rotatably supports multiple first planetary gears engaging with the first sun gear, multiple second planetary gears provided to be coaxial with the respective first planetary gears and to rotate integrally with the respective first planetary gears, and multiple third planetary gears respectively engaging with the second planetary gears, an internal gear engaging with the multiple first planetary gears, and a second sun gear disposed to be coaxial with the first sun gear and engaging with the multiple third planetary gears, the first sun gear is connected to the lower end of the upper drive shaft, the internal gear is connected to the lower case so as to provide the lower case with a torque in a direction opposite to a rotation direction of the lower drive shaft, and the synchronization mechanism is capable of taking a first state to connect the planetary carrier to the lower drive shaft and a second state to connect the second sun gear to the lower drive shaft.

4. The outboard motor according to claim 3, wherein the internal gear and the lower case are connected to each other by a transmission mechanism with a predetermined speed ratio, and the speed ratio is set to satisfy a following relationship:

$$\text{the speed ratio}=1+1/(\text{the planetary gear ratio}-1)$$

$$\text{the planetary gear ratio}=(Za+Zc)/Za,$$

wherein Za is a number of teeth of the first sun gear and Zc is a number of teeth of the internal gear.

5. The outboard motor according to claim 3, wherein the internal gear and the lower case are connected to each other by a transmission mechanism with a predetermined speed ratio, and the speed ratio is set to satisfy a following relationship:

$$\text{speed ratio}=1-1/(\text{planetary gear ratio}-1)$$

$$\text{planetary gear ratio}=(Zp1/Zc+Zp1/Za1)/(Zp2/Za2-Zp1/Zc),$$

wherein Za1 is a number of teeth of the first sun gear, Za2 is a number of teeth of the second sun gear, Zc is a number of teeth of the internal gear, Zp1 is a number of teeth of each first planetary gear, and Zp2 is a number of teeth of each second planetary gear.

6. The outboard motor according to claim 4, wherein the number of teeth of each first planetary gear is equal to the number of teeth of each second planetary gear.

7. The outboard motor according to claim 5, wherein the number of teeth of each first planetary gear is equal to the number of teeth of each second planetary gear.

* * * * *